United States Patent [19]

Wick

[11] Patent Number: 4,844,123

[45] Date of Patent: Jul. 4, 1989

[54] QUICK-CONNECT CYLINDER VALVE AND CONNECTOR

[75] Inventor: Bruce J. Wick, Avon Lake, Ohio

[73] Assignee: Western/Scott Fetzer Company, Westlake, Ohio

[21] Appl. No.: 241,120

[22] Filed: Sep. 6, 1988

[51] Int. Cl.[4] .............................................. F16L 37/28
[52] U.S. Cl. ................. 137/322; 251/149.5; 137/614.2
[58] Field of Search ...... 137/322; 251/149.5, 251/149.6; 137/614.2

[56] References Cited

U.S. PATENT DOCUMENTS

| 562,414 | 6/1896 | O'Leary et al. | 251/149.5 |
| 2,818,279 | 12/1957 | Knapp | 285/89 |
| 3,230,964 | 1/1966 | Pebrotnic et al. | 251/149.5 |
| 3,353,724 | 11/1967 | Johnston | 137/322 |
| 4,390,160 | 6/1983 | Reed | 251/149.6 |
| 4,629,159 | 12/1986 | Wellenstam | 251/149.6 |

FOREIGN PATENT DOCUMENTS 1105615 3/1968 United Kingdom ............... 137/322

Primary Examiner—A. Michael Chambers
Attorney, Agent, or Firm—Pearne, Gordon, McCoy & Granger

[57] ABSTRACT

A quick-connect cylinder valve and connector provides a tank connector half mounted in a high-pressure tank containing liquefied carbon dioxide and a base connector half mounted in an upright position. Each connector half provides a valve which is closed when the connector halves are not connected. The connector operates to support the tank in a vertical position and is arranged to provide easy installation and removal of the tank even in confined locations in which access is limited. The two connector halves provide cylindrical telescoping surfaces which align the connector halves during initial assembly. After the connector halves are aligned, a probe on the base connector half enters a seal on the tank connector half to form a fluidtight joint therebetween. Thereafter, at full assembly, the probe opens the valve contained in the tank connector half. The weight of the tank and its contents opposes the blowoff force created by the pressure within the assembled connector. Such blowoff force is a function of the diameter of the probe, which is sized so that excessive blowoff of reaction forces does not exist. A bayonet lock prevents accidental blowoff from occurring.

14 Claims, 4 Drawing Sheets

QUICK-CONNECT CYLINDER VALVE AND CONNECTOR

BACKGROUND OF THE INVENTION

This invention relates generally to quick-connect and disconnect couplings, and more particularly to a novel and improved valve quick-connect coupling for mounting and connecting high-pressure liquefied gas cylinders in a system using such gas.

PRIOR ART

It is well known to produce carbonated water by mixing carbon dioxide and water. Further, it is known to supply the carbon dioxide to the charging system from a high-pressure tank containing liquefied carbon dioxide.

It is also known to provide quick-disconnect couplings with valves which are closed to prevent flow when disconnected and which are automatically opened for through-flow when a connection is made.

It is also known to provide a bayonet-like connection to releasably lock a quick-disconnect coupling together. Examples of such devices are illustrated in U.S. Pat. Nos. 2,818,279; 4,390,160; and 4,629,159.

The tank pressure, when the compressed gas is liquefied carbon dioxide, is dependent upon the pressure of the liquid carbon dioxide and is quite high. For example, the pressure at normal ambient temperatures is in the order of 850 psi. Such high pressures tend to produce high reaction forces in a coupling, tending to cause separation of the coupling. Typically, prior systems for connecting tanks of liquefied carbon dioxide to carbonation systems have had to be exhausted before the connection could be made or the connection released.

Since people who operate such systems are not normally trained technicians, they often encountered problems in stalling and removing such high pressure tanks. Such problems have been further complicated in many instances because the tank is located in a relatively confined, difficult-to-reach location.

SUMMARY OF THE INVENTION

The present invention provides a novel and improved quick-connect-disconnect coupling particularly suited for connecting a tank of high pressure gas to a system supplied with such gas. The illustrated embodiment provides a quick-connect coupling for mounting and connecting a cylinder of liquefied carbon dioxide within a cabinet of a water cooler for producing carbonated water.

The coupling includes a coupling half mounted on the tank containing liquefied carbon dioxide or the like and a second coupling half which is mounted within the cabinet. When the coupling is connected, the tank is supported in a vertical position within the cabinet and is connected to the carbonation system of the water cooler.

The coupling is structured to permit easy positioning of the tank within the cabinet. The valve within the tank coupling half is protected and remains closed until the coupling is properly aligned and sufficiently connected to provide full support and positioning of the cylinder.

A rotary bayonet-type connection and lock is provided on the two coupling halves. The valve contained in the tank half of the coupling half remains closed until the bayonet connection is engaged a sufficient amount to prevent a "blowoff" of the tank.

Further, substantial interengagement of the two coupling halves is provided before the bayonet lock starts to engage. Therefore, full and proper alignment of the two coupling halves is established during the initial portion of the installation.

The bayonet lock includes a pair of opposed, inclined entrance ramps and mating projections. Further, the bayonet lock also includes oppositely inclined lock ramp portions which receive such mating projections in a latched or locked position in which the bayonet lock securely connects the two coupling halves locked together when the tank is fully installed.

During installation of the tank, a tubular probe on the mounting half enters a seal on the tank half and forms a fluidtight joint therebetween before the tank valve is opened. When the final connection is made, the probe engages the tank valve and maintains it open for flow of gas from the tank to the carbonation system.

The pressure of the gas within the tank operates to hold the bayonet locked in its fully locked position. Such pressure provides sufficient force of separation between the two coupling halves to overcome the weight of the tank and its contents, and maintains the connector in its latched position. However, the weight of the tank and its contents operates to assist in the installation of the tank. After the contents of the tank are exhausted, it is a simple matter to rotate the tank to release the bayonet lock and remove the tank from the cabinet.

With this invention, it is possible to easily install or remove a tank of high pressure gas even in a confined, difficult-to-reach location without danger of damage to the equipment or danger to the person making the installation.

These and other aspects of this invention are illustrated in the accompanying drawings, and are more fully described in the following specification.

DETAILED DESCRIPTION OF THE DRAWINGS

Figure 1:
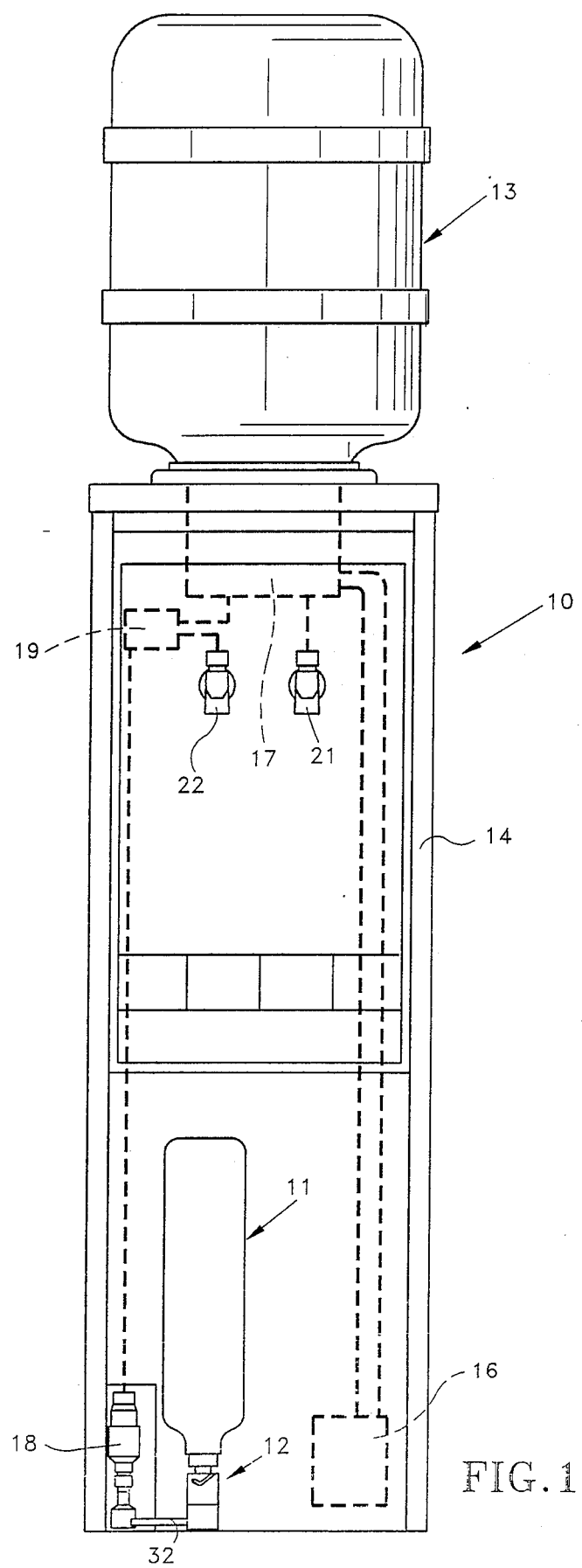
FIG. 1 is a schematic illustration of a water cooler incorporating a tank mounting system in accordance with this invention and for producing and dispensing carbonated water.

FIG. 1 schematically illustrates a water cooler 10 with a tank 11 of liquefied carbon dioxide mounted therein and connected to the dispensing system of the cooler by a coupling 12 in accordance with this invention. The illustrated water cooler 10 supports a bottle 13 of water on the upper end of its cabinet 14. Located within the cabinet is a compressor schematically illustrated at 16, which functions to refrigerate a cooling tank, schematically illustrated at 17, in which the water from the bottle 13 is cooled.

The tank 11 is connected through the coupling 12 and a pressure-reducing valve or regulator 18 to a mixing chamber 19, in which the water from the bottle 13 and the carbon dioxide from the tank 11 are mixed to produced carbonated water. Typically, such regulator reduces the carbon dioxide gas from about 850 psi to about 70 psi to 75 psi. A cold water valve or tap 21 is provided to dispense cold water directly from the cooling tank 17 and a carbonated water valve or tap 22 is connected to dispense carbonated water which passes from the cooling tank 17 through the mixing chamber 19 and then to the valve 22.

It should be understood that the illustrated water cooler represents only one system to which the tank support and coupling 12 in accordance with this invention is particularly applicable. The coupling 12 may, for example, be used in entirely different types of installations, and may also be used to connect a supply of other fluids under pressure to substantially any type of system requiring a supply of such other fluid under pressure. The illustrated installation provides an example of one installation to which the present invention is well suited, but should not be considered to limit this invention defined in the following claims.

The mounting and coupling structure in accordance with the illustrated embodiment of this invention is particularly suited for connecting high pressure tanks to systems requiring a supply of fluid under high pressure from the tank in which the tank must be supported and positioned in a relatively confined location which is often difficult to reach. The coupling itself is structured to not only support the high pressure tank within the system, but also to provide reliable and easy installation of a fully charged tank and removal of an empty tank. The coupling is further structured to prevent damage to the coupling parts.

Figures 2, 3:
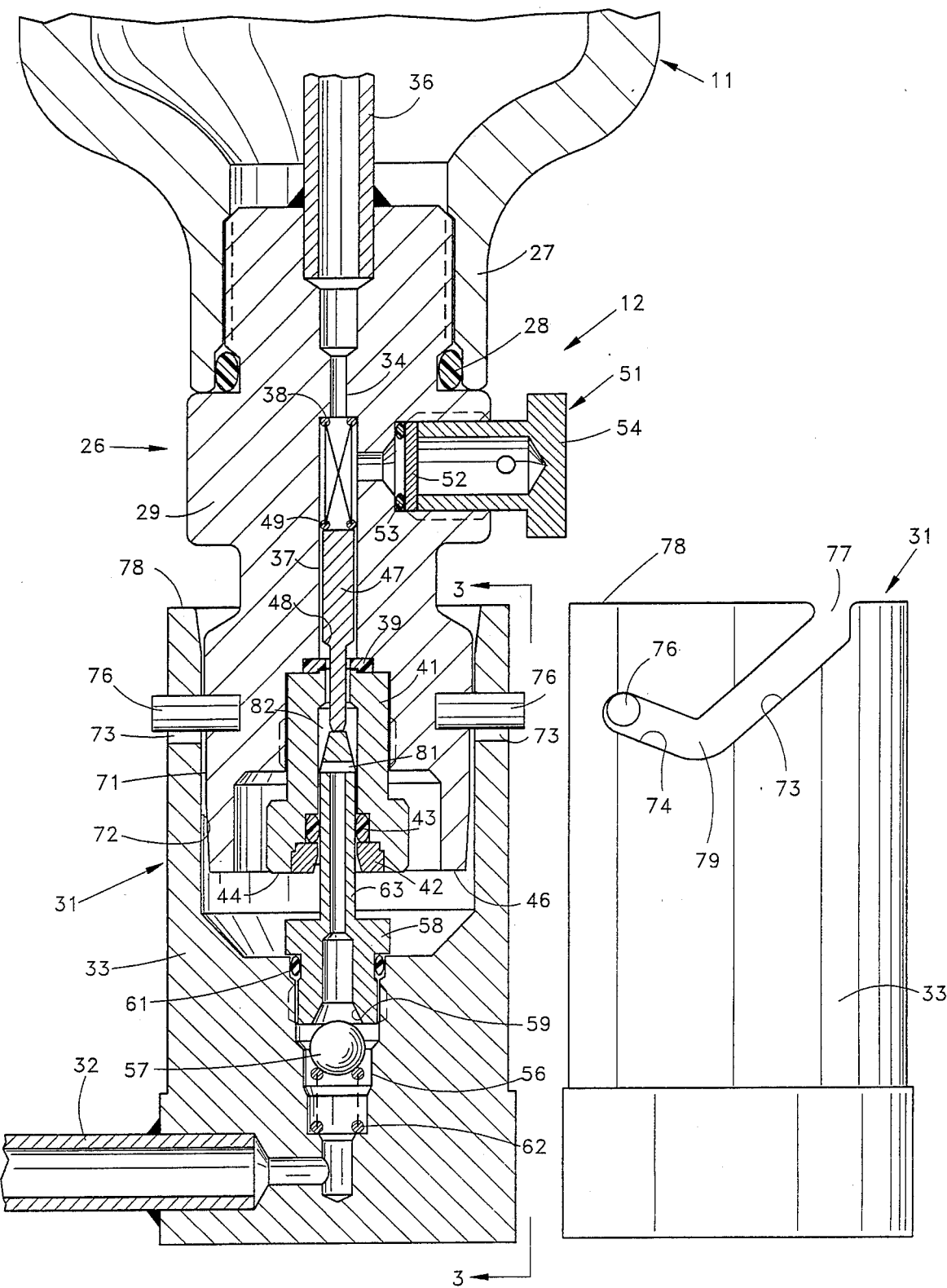
FIG. 2 is a longitudinal section of the mounting and quick-disconnect coupling which supports a tank of liquid carbon dioxide and which also releasably connects the tank to the dispensing system.
FIG. 3 is a fragmentary view taken along line 3—3 if FIG. 2, illustrating the bayonet lock in the position it assumes when the coupling is in the position of FIG. 2.

Referring to FIG. 2, the coupling 12 includes a first coupling half 26 threaded into the neck 27 of the tank 11. An O-ring seal 28 provides a fluidtight joint between the body 29 of the coupling half 26 and the tank 11. The coupling 12 also provides a second or mounting half 31 mounted within the cabinet 14 and connected to the pressure-reducing valve 18 by a pressure line 32. The body 33 of the coupling half 31 is securely mounted within the cabinet 14 in an upright position so that it supports the tank 11 in a vertical position within the cabinet when the coupling 12 is in the connected position of FIG. 6.

The body 29 of the coupling half 26 is provided with an axial passage 34 therethrough which connects to the lower end of a supply tube 36. The supply tube 36 extends up into the tank to a location above the surface of the liquid carbon dioxide contained within the tank 11 into the zone within the tank in which gaseous carbon dioxide is present. Therefore, only gaseous carbon dioxide is allowed to enter the passage 34 in the coupling.

The passage 34 provides an axially extending valve chamber 37 extending from a shoulder 38 to a resilient valve seat 39 located at the lower end of the valve chamber 37. The valve seat is positioned within the passage 34 by a tubular valve nut 41 threaded into the body 29 below the valve seat 39. Mounted in the lower end of the valve nut 41 by a seal retainer ring 42 which threads into the lower end of the valve nut is an O-ring seal 43. The lower end 44 of the valve nut 41 is substantially flush with the lower end 46 of the body 29.

Figures 4, 5:
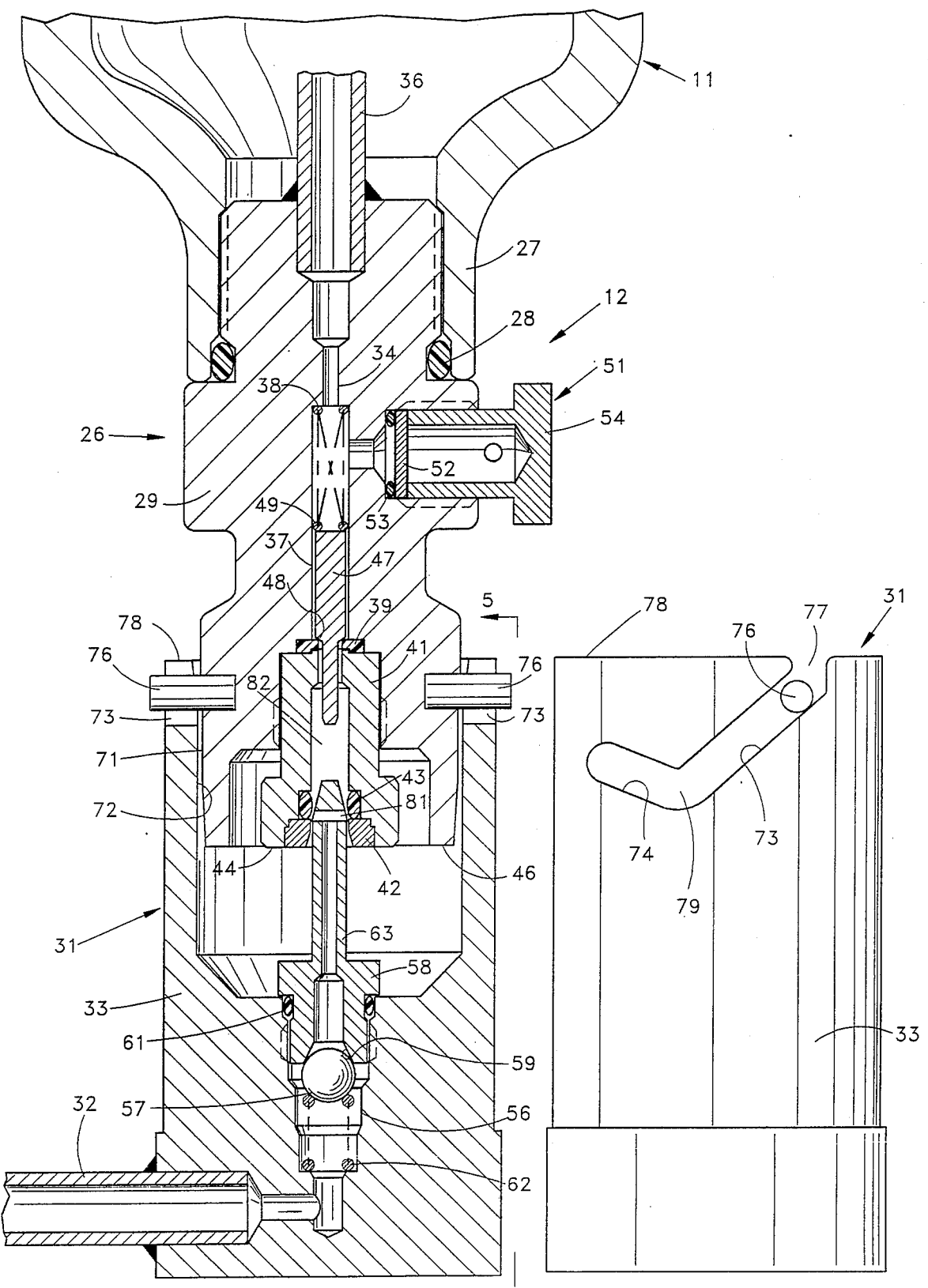
FIG. 4 is a longitudinal section similar to FIG. 2 but illustrating the coupling in a partially assembled position in which a seal is about to be established between the two coupling halves.
FIG. 5 is a fragmentary view taken along line 5—5 of FIG. 4, illustrating the bayonet lock in its position corresponding to the coupling position of FIG. 5.
Figures 6, 7:
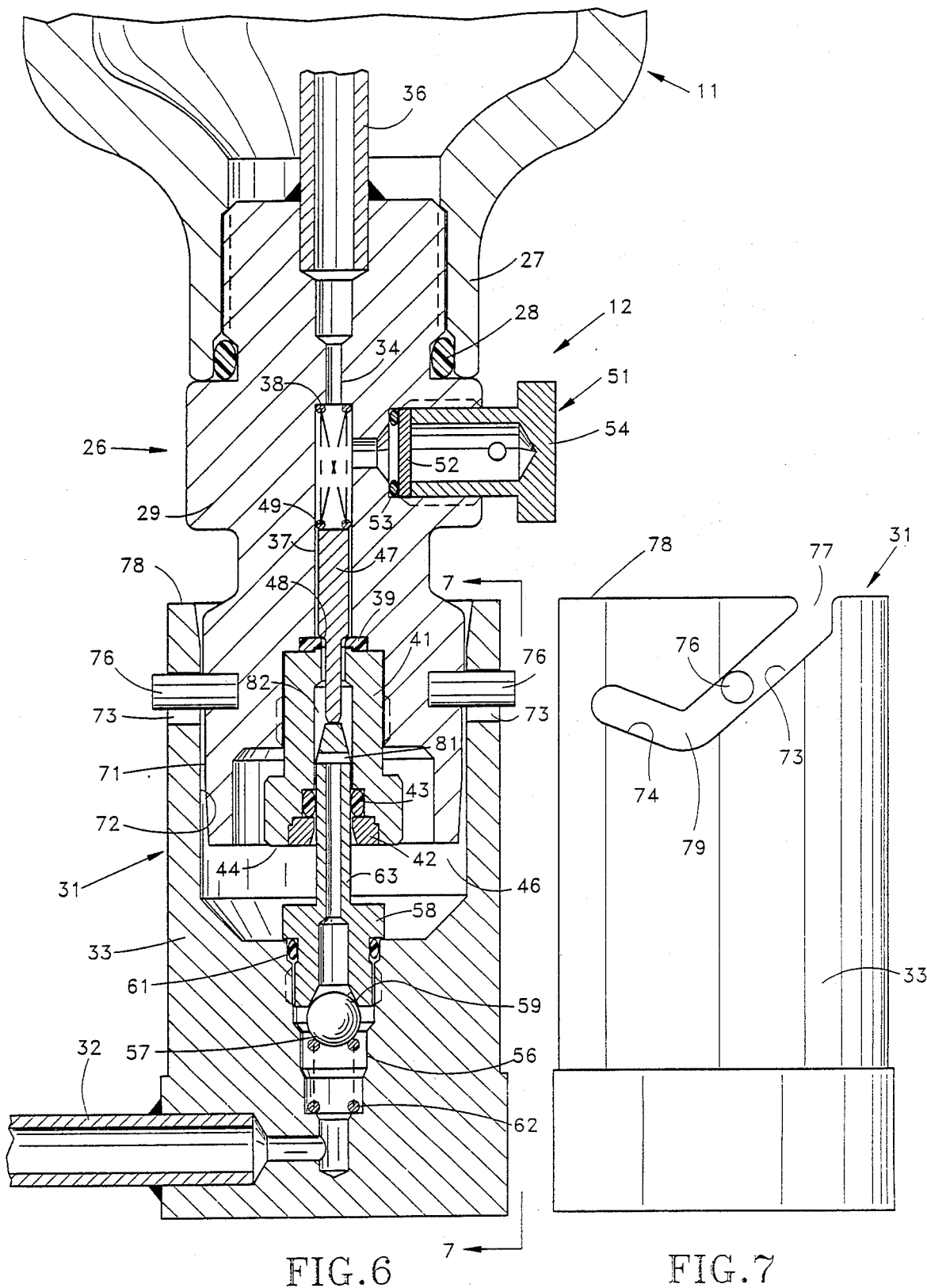
FIG. 6 is a longitudinal section similar to FIGS. 2 and 4, illustrating the coupling in the partially assembled position in which the valve in the tank coupling half is about to open.
FIG. 7 is a fragmentary view taken along line 7—7 of FIG. 6, illustrating the position of the bayonet lock corresponding to the coupling position of FIG. 6.

A valve plunger 47 is positioned for axial movement within the valve chamber 37, and provides a shoulder 48 sized to engage and seal with the valve seat when the valve plunger is in the closed position of FIGS. 4 and 6. A valve spring 49 extends between the shoulder 38 and the upper end of the valve plunger 47 to normally maintain the valve plunger in the closed position, but allows movement to an open position, illustrated in FIG. 2, in which the shoulder 48 is lifted off the valve seat 39. Whenever the coupling is not assembled, the valve plunger 47 is in the closed position and prevents fluid from exhausting from the tank 11.

Mounted in the side of the body 29 is a relief valve assembly 51 which includes a frangible disc 52 pressed against an O-ring seal 53 by a relief valve body 54 threaded into the body 29. In the event that excessive pressure develops with the tank for any reason, the disc 52 ruptures and releases the pressure.

The second coupling half 31 provides an axial passage 56 connected at its lower end to the pressure line 32 and containing a ball check valve 57. Threaded into the upper end of the passage 56 is a valve pin 58 which provides a valve seat 59 for the ball check valve 57. A seal 61 provides a fluidtight joint between the valve pin 58 and the body 33. A spring 62 positioned within the passage 56 below the ball check valve normally maintains the ball check valve in engagement with the valve seat 59, but allows movement of the ball check valve 57 to an open position when the pressure above the ball exceeds the pressure in the passage 56 below the ball.

The valve pin 58 provides a tubular probe portion 63 which extends along the axis of the coupling and is proportioned to extend through the O-ring seal 43 into the valve nut 41 when the coupling is assembled. The upper end of the probe operates to engage an operating projection 64 on the valve plunger 47, and to lift the shoulder 48 off the valve seat 39 when the coupling is in the fully connected position of FIG. 2. In such position, the compressed gas flows down around the valve plunger 47 and through the tubular probe 63, which causes the check valve 57 to open so that the compressed gas is delivered to the carbonation system through the pressure line 32. However, when the coupling is not connected, the valve plunger 47 and the ball check valve 57 operate to close both coupling halves.

The two bodies 29 and 31 are formed with cylindrical surfaces 71 and 72, respectively. The cylindrical surface 71 on the body 29 is an external surface sized to telescope with an internal cylindrical surface 72 on the body 33. Such telescoping action of the two cylindrical surfaces provides full lateral support between the two coupling halves, and ensures that they assume a position of coaxial alignment when the two coupling halves are connected and disconnected.

The two bodies are also provided with a bayonet-type connection, including opposed and similar downwardly inclined entrance ramps 73 and upwardly inclined locking ramps 74, best illustrated in FIGS. 3, 5, and 7. Mounted on the body 29 of the first coupling half and extending from the cylindrical surface 71 thereof are a pair of projecting pins 76 to complete the bayonet lock structure.

The entrance ramps 73 extend downwardly from openings 77 in the end 78 of the body 33 to junctions at 79 with the upwardly extending locking ramps 74.

During the initial assembly, the two coupling halves 26 and 31 are moved initially to the position of FIGS. 4 and 5. It should be noted that the tubular probe 63 is spaced back a substantial distance from the end face 78 of the body 33. Therefore, during assembly of the coupling, the cylindrical surface 71 of the first coupling half 26 projects a sufficient distance into telescoping relationship with the cylindrical surface 72 of the coupling half 33 to establish a coaxial relationship between the two coupling halves before the probe 63 enters the seal retaining ring 42. Consequently, correct alignment is initially established before any contact can occur between the probe and the upper coupling half 26.

In the event that the pins 76 are not aligned with the entrance 77, they engage the end surface 78 of the body 33 to prevent further telescoping movement. The person installing the tank then merely rotates the tank and the upper coupling half 26 until the pins drop into the entrances 77 of the entrance ramps 73 under the influence of the weight of the tank. The pin then engages the lower surface of the associated entrance ramp 73 and the weight of the cylinders cams the upper connector half in a rotational direction, causing the probe 63 to enter the seal 43. In the position of FIGS. 4 and 5, the probe has not engaged the seal 43. However, at such location, the locking pins are down along the entrance ramps and are spaced from the entrances 77 thereof for the reasons discussed in greater detail below.

As the assembly continues by relative rotation between the upper coupling half 26 and the lower coupling half 31, the various elements move to a position of FIGS. 6 and 7, in which the probe 63 extends past the seal 43 and a fluidtight joint is provided between the two coupling halves. In such position, the end of the probe engages the operating projection 64. It should be noted that in such position, the pins 76 are spaced a substantial distance from the entrances 77 of the entrance ramps 73 and the probe has extended past the seal a substantial distance so that a cross passage 81 in the probe 63 is well past the seal 43. Up to this point in the assembly of the coupling, the valve plunger 47 remains in its closed position and the weight of the tank and its contents urges the coupling toward a full assembled position.

As the coupling is assembled beyond the position of FIGS. 6 and 7 to the fully connected position of FIGS. 2 and 3, continued relative rotation occurs between the two coupling halves and the probe 63 operates to open the valve in the first coupling half 26 to establish communication through the coupling from the tank to the pressure line 33. Continued rotation between the two coupling halves causes the pins 76 to move past the junctions 79 into the locking ramps 74.

Once the plunger valve 47 is open, the tank pressure exists in the portion 82 of the passage 34 and produces a pressure-induced reaction force urging the two coupling halves apart. Such force is a function of the pressure within the tank times the area of the probe 63 within the seal 43. The probe 63 is sized so that this reaction force is sufficient to overcome the weight of the tank and its contents so that the two coupling halves maintain the locking pins 76 at the upper ends of the locking ramps 74. In such position, the coupling is locked together and accidental blowoff cannot occur. Further, the cross-sectional area of the probe 63 is preferably selected so that the reaction force does not substantially exceed the weight of the tank and its contents. For example, in the illustrated embodiment, the tank and contents, when the tank is full, weigh about five pounds, and the reaction force is about ten pounds. Therefore, the net force of separation is only about five pounds. Consequently, difficulty is not encountered in rotating the coupling halves to the locked position. If the probe diameter is too large, a high reaction force would be provided which would make it difficult to complete the assembly of the coupling by rotating the tank 11 and coupling half 26 from the position of FIG. 6 to the fully assembled position of FIG. 2. The tank weight and tank contents, however, oppose the reaction force and assist in the assembly and disassembly of the coupling.

As the compressed gas within the tank passes through the coupling to the connected system, the weight of the tank and its contents diminishes until the tank 11 is empty. At such time, the pressure within the passage portion 82 drops and the reaction force produced by such pressure is reduced. When the supply of compressed fluid within the tank is exhausted, the pressure in the passage portion 82 drops and the weight of the tank is sufficient to overcome any existing reaction force. The user then merely rotates the upper coupling half 26 so that the pins 76 move along the ramps to the entrances 77 of the entrance ramps 73, permitting removal of the empty tank and its coupling half. Subsequently, a fully charged tank can be installed and continued operation can occur.

In the event that the coupling is only assembled to a position slightly past the position of FIGS. 6 and 7, causing the passage portion 82 to be fully pressurized, and in the event that the coupling halves are not rotated to the fully connected position of FIG. 2, the reaction force within the chamber portion 82 cannot cause a blowoff separation of the two coupling halves. Even if the tank is released in such position, the engagement between the pins 76 and the associated entrance ramp prevents the tank from blowing off. At most, this reaction force can cam the pins up along the entrance ramps 73, allowing the plunger valve 47 to reclose. As such action occurs, additional compressed gas cannot be delivered to the passage portion 83 and upward movement of the coupling half 26 causes an increase in volume of the passage portion 82 and reduces the pressure therein. Before the lock pins 76 reach the entrances 77, the probe 63 clears the seal 43 and completely exhausts the passage portion 82 so that a blowoff condition cannot occur.

Although the illustrated embodiment provides a coupling which supports the pressure tank in an inverted position, it is within the broader aspects of this invention to provide a coupling that does not actually support the tank or cooperate with a tank that is not inverted. For example, the coupling may be connected to a tank which is mounted in an upright position and is not supported by the coupling. In such installation, the coupling half connected to the system supplied with fluid under pressure would normally be connected to the system by a flexible conduit.

Also, the pressure regulator 18 can be incorporated into the body of the coupling halves if desired, eliminating the need for a separate pressure regulator.

With the coupling incorporating the present invention, a relatively small number of simple elements provide a reliable releasable connection which not only provides a support for the associated tank 11 but also permits the easy and safe installation and removal of a tank, even in an inaccessible location where it is difficult for the person installing the tank to visually establish alignment between the two coupling halves. In fact, the lower portion of the cylindrical wall 71 of the upper coupling half is tapered inwardly and the upper portion of the cylindrical wall 72 of the lower coupling half is flared outwards to facilitate the initial entry of the upper coupling half into the lower coupling half. Therefore, it is merely necessary for the installer to locate the lower end of the upper coupling half in the entrance of the lower coupling half and then tip the tank around until the tank weight carries the cylindrical walls into telescoping relationship to establish proper axial alignment between the two coupling halves.

Since the probe 63 is spaced substantially back from the end 78, it cannot be engaged and damaged by a misaligned upper coupling half. Similarly, the plunger 47 is substantially spaced back from the end 46 of the upper coupling half and is protected against accidental damage.

The diameter of the probe 63 is relatively small so that excessive pressure-induced reaction forces are not developed even in high pressure systems. However, since it is enclosed within the body 33 and spaced back from its end 78, it is not subject to damage. Further, since the cylindrical walls 71 and 72 are relatively large and thick, having a diameter more than seven times the diameter of the probe 63 in the illustrated embodiment, they provide a strong supporting and aligning structure for the installed tank.

Although the preferred embodiment of this invention has been shown and described, it should be understood that various modifications and rearrangements of the parts may be resorted to without departing from the scope of the invention as disclosed and claimed herein.

What is claimed is:

1. A pressure tank system comprising a tank containing fluid under pressure, a coupling for removably connecting said tank to a system using said fluid under pressure, said coupling including a tank coupling half mounted on said tank and a system coupling half mounted on said system in an upright position, said coupling halves providing interfitting telescoping surfaces each extending from an open end and operating to position and support said tank in a vertical position when said coupling halves are connected, said tank coupling half providing a normally closed valve having an operator extending into a downwardly open passage, said normally closed valve and said downwardly open passage being recessed back from said open end of said tank coupling half, said system coupling half providing an upwardly extending tubular probe extending into said passage and engaging said operator to open said valve when said coupling halves are connected, said probe being recessed back from said open end of said system coupling half, said probe being spaced from said normally closed valve and said downwardly open passage until after said telescoping surfaces interfit, said fluid under pressure producing a reaction force urging separation of said coupling halves, said coupling halves providing lock means preventing separation of said coupling halves when said reaction force exists.

2. A system as set forth in claim 1, wherein said reaction force has a value greater than the weight of said tank and its contents.

3. A system as set forth in claim 1, wherein seal means are provided to establish a fluidtight joint between said passage and probe when said probe extends into said passage without restricting movement of said probe along said passage.

4. A system as set forth in claim 3, wherein said seal means establishes said fluidtight joint as said probe enters said passage and before said probe engages said operator to open said valve.

5. A system as set forth in claim 3, wherein said seal means forms said fluidtight joint only after said lock means are engaged to prevent separation of said coupling halves.

6. A system as set forth in claim 3, wherein said reaction force is a function of the size of said probe and the pressure of said fluid under pressure.

7. A system as set forth in claim 6, wherein said lock means is a bayonet-type lock providing a fully locked position, and said reaction force maintains said bayonet lock in said fully locked position.

8. A system as set forth in claim 7, wherein said interfitting telescoping surfaces establish alignment between said coupling halves before said probe enters said passage and prevents damage to said probe caused by engagement thereof with said tank coupling half.

9. A system as set forth in claim 2, wherein said reaction force is no more than about twice the weight of said tank and its contents.

10. A system as set forth in claim 2, wherein said probe is cylindrical having a diameter, and said interfitting telescoping surfaces are cylindrical having a diameter at least six times the diameter of said probe.

11. A valved coupling for connecting highpressure liquefied gas tanks to a system for using such gas, comprising a first coupling half adapted to be connected to said system and a mating coupling half adapted to be connected to said tank, said first coupling half providing a first cylindrical wall defining a cylindrical cavity, said mating coupling half providing a second cylindrical wall sized to telescope into said first wall with a close fit, a central passage in said mating coupling half adapted for communication at one end with said tank and open at its other end to the end of said mating coupling half, a valve seat in said mating coupling half around said passage spaced from said end, a valve plunger in said passage on the side of said valve seat remote from said end, a seal in said mating coupling half around said passage on the side of said valve seat adjacent to said end, a tubular probe on said first coupling half projecting along the center of said cavity, and a rotational bayonet lock operable upon relative rotation between said coupling halves to lock said coupling halves in a connected position in which said probe extends into said passage and through said seal into engagement with said plunger valve holding said plunger valve off said seat, said other end of said central passage being spaced back from the end of said mating coupling half, said tubular probe being spaced back from the end of said first coupling half, said second cylindrical wall telescoping with said first cylindrical wall and establishing alignment between said coupling halves before said tubular probe enters said passage and preventing damage to said probe caused by engagement therewith of said mating coupling half.

12. A valve coupling as set forth in claim 11, wherein said probe is sized to cause a reaction force which is a function of the pressure in said cylinder sufficient to maintain said bayonet lock in said locked position.

13. A releasable coupling for tanks of fluid under pressure comprising a first body assembly adapted to be mounted on said tank, a second body assembly adapted to be connected to a system using said fluid under pressure, each of said body assemblies providing a cylindrical guide surface sized for telescoping mating engagement by relative movement along the axis of said cylindrical surfaces, said first body assembly having an end and providing a passage extending back along the axis thereof from said end, a valve seat around said passage spaced back from said end, a valve member normally engaging said valve seat and providing an operator extending through said valve seat and along said passage toward said end, said second body assembly providing a tubular probe extending along the axis thereof sized and positioned to extend into said passage when said body assemblies are telescoped together, said tubular probe being spaced back from the end of said second body assembly, seal means for providing a seal between said passage and said probe when said probe extends into said passage without restricting relative axial movement between said probe and said first body assembly, said telescoping movement of said body assemblies sequentially causing
   (a) engagement between said cylindrical surfaces to establish alignment between said body assemblies before said probe enters said passage,
   (b) said seal means to establish a seal between said probe and said passage as said probe enters said passage,
   (c) said probe to engage said operator and move said valve member away from said valve seat as said body assemblies move to an assembled position, and rotary locking means on said body assemblies operating by relative rotation therebetween to connect and lock said body assemblies together in said assembled position, said lock means engaging to resist separation between said body assemblies when said valve member is spaced from said valve seat.

14. A coupling as set forth in claim 13, wherein said lock means engages to resist separation between said body assemblies in all positions of said coupling in which said seal means establishes a seal between said probe and said passage.

* * * * *